(12) United States Patent
Djuricic et al.

(10) Patent No.: US 10,035,732 B2
(45) Date of Patent: Jul. 31, 2018

(54) REFRACTORY PRODUCT, BATCH FOR PRODUCING THE PRODUCT, METHOD FOR PRODUCING THE PRODUCT, AND USE OF THE PRODUCT

(71) Applicant: Refractory Intellectual Property GmbH & Co. KG, Vienna (AT)

(72) Inventors: Boro Djuricic, Leoben (AT); Norbert Freiberger, Graz (AT); Jurgen Muhlhausser, Leoben (AT); Christoph Bauer, Graz (AT)

(73) Assignee: REFRACTORY INTELLECTUAL GMBH & CO. KG, Vienna (AT)

( * ) Notice: Subject to any disclaimer, the term of this patent is extended or adjusted under 35 U.S.C. 154(b) by 0 days.

(21) Appl. No.: 15/513,969

(22) PCT Filed: Sep. 8, 2015

(86) PCT No.: PCT/EP2015/070445
§ 371 (c)(1),
(2) Date: Mar. 23, 2017

(87) PCT Pub. No.: WO2016/087065
PCT Pub. Date: Jun. 9, 2016

(65) Prior Publication Data
US 2017/0275205 A1    Sep. 28, 2017

(30) Foreign Application Priority Data

Dec. 2, 2014 (EP) ...................... 14195950

(51) Int. Cl.
*C04B 35/10* (2006.01)
*C04B 38/00* (2006.01)
*C04B 35/103* (2006.01)

(52) U.S. Cl.
CPC ............ *C04B 35/10* (2013.01); *C04B 35/103* (2013.01); *C04B 38/0058* (2013.01)

(58) Field of Classification Search
CPC . C23F 15/00; C23C 4/134; C23C 4/02; C23C 4/129; C25D 13/02; C25D 9/04; C25D 17/00
See application file for complete search history.

(56) References Cited

U.S. PATENT DOCUMENTS

| | | | |
|---|---|---|---|
| 8,176,831 B2 * | 5/2012 | Kucherov | ............. F41H 5/0421 89/36.02 |
| 2010/0055492 A1 | 3/2010 | Barsoum et al. | |
| 2017/0137949 A1 * | 5/2017 | Bahraini Hasani | ..... C23F 15/00 |

FOREIGN PATENT DOCUMENTS

CN    103086742 A    5/2013

OTHER PUBLICATIONS

Liu, et al, "Microstructure and Properties of Al2O3—TiC—Ti3SiC2 Composites Fabricated by Spark Plasma Sintering", In Advances in Applied Ceramics: Structural, Functional Andbioceramics, vol. 109, No. 7, Jul. 18, 2013, pp. 394-398.

(Continued)

*Primary Examiner* — Noah S Wiese
(74) *Attorney, Agent, or Firm* — Medley, Behrens & Lewis, LLC.

(57) ABSTRACT

The invention relates to a refractory product, a batch for producing the product, a method for producing the product, and a use of the refractory product.

7 Claims, 3 Drawing Sheets

(56) References Cited

OTHER PUBLICATIONS

Figure 1:
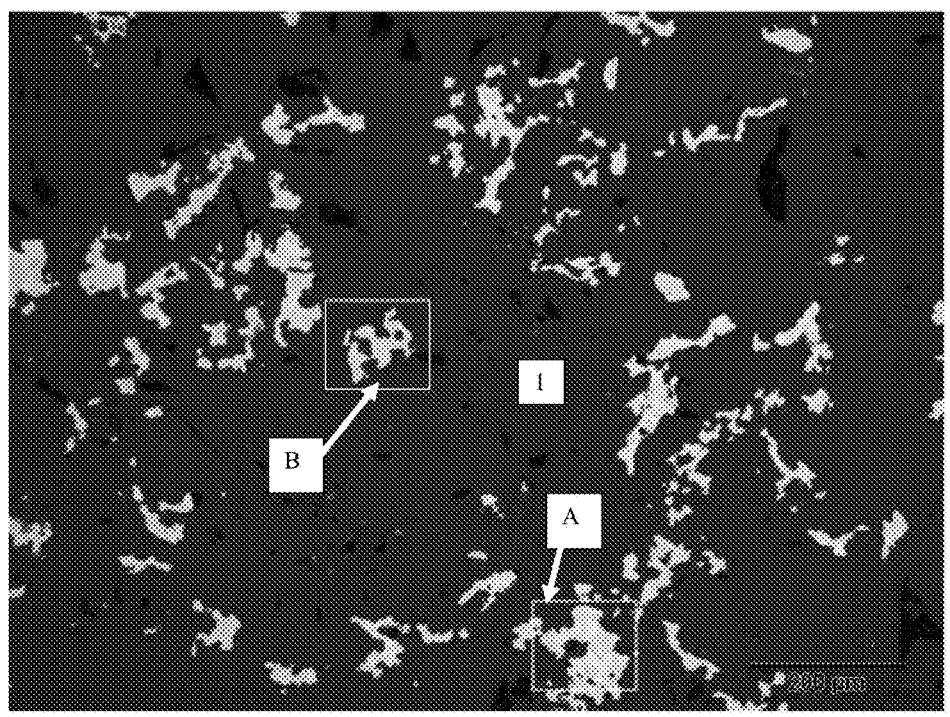

Luo et al., "Fabrication of Al2O3—Ti3SiC2 Composites and Mechanical Properties Evaluation", In Materials Letters, vol. 57, Nos. 16-17, May 2003, pp. 2509-2514.
Yongming, et al., "Preparation and Characterization of Al2O3—Ti3SiC2 Composites and Its Functionally Graded Materials", vol. 38, No. 1, Jan. 1, 2003, pp. 69-78.
Chin, et al., "Contribution of Plastic Deformation of Ti3SiC2 to the Crack Deflection in the Al2O3/Ti3SiC2 Composites", In Materials Science and Engineering: A, vol. 528, Nos. 7-8, Mar. 25, 2011, pp. 3270-3274.

* cited by examiner

REFRACTORY PRODUCT, BATCH FOR PRODUCING THE PRODUCT, METHOD FOR PRODUCING THE PRODUCT, AND USE OF THE PRODUCT

The invention relates to a refractory product, a batch for producing the product, a method for producing the product, and a use of the refractory product.

The term "refractory product" in the sense of the invention in particular designates refractory ceramic products having a use temperature of more than 600° C. and preferably refractory materials in accordance with DIN 51060, i.e. materials having a pyrometric cone equivalent >PC 17. The pyrometric cone equivalent can be determined in particular in accordance with DIN EN 993-12:1997.

As is known, a batch designates a composition formed of one or more components by which a refractory product can be produced by way of a temperature treatment, i.e. in particular by way of a firing or a melting process.

Refractory products are often exposed during use thereof to aggressive liquids and gases at high temperatures, for example slags and glass melts or metal melts. These may infiltrate the refractory product through cracks and pores, which may lead to a corrosion of the product. In order to improve the resistance to corrosion of refractory products it is therefore often desirable to produce products having as few cracks as possible and also having as few pores as possible, said pores also being as small as possible. Such high-density and largely crack-free refractory products, however, often have only a relatively low resistance to thermal shock on account of the brittleness of refractory products.

Technologies that reduce the brittleness of a refractory product or improve the resistance thereof to thermal shock and also the structural resilience thereof, respectively, are therefore known from the prior art.

By way of example, it is thus known to reduce the brittleness of refractory products on the basis of corundum ($Al_2O_3$), magnesia (MgO) and/or magnesia spinel ($MgO.Al_2O_3$) by what are known as elastifiers, which are incorporated into the matrix of the product, and to thereby improve the resistance of the product to thermal shock. The efficacy of these elastifiers is based on the fact that they have a different coefficient of thermal expansion compared with the main component of the refractory product, such that stresses are produced between the elastifier and the main component during the temperature treatment of the product and the subsequent cooling thereof. Microcracks thus form in the product, which, in the case of mechanical action exerted on the product, compensate for part of the fracture energy, whereby the risk of a brittleness fracture of the product can be reduced. A disadvantage of the use of such elastifiers, however, is that the resistance to corrosion of the products may be lowered on account of the produced microcracks.

It is also known to improve the structural flexibility of refractory products based on magnesia or corundum by carbon. A problem with such MgO—C bricks or $Al_2O_3$—C bricks, however, is the low thermal stability of the carbon at high temperatures, in particular in an oxidising atmosphere.

The invention is based on the object of providing a refractory product based on corundum ($Al_2O_3$), which product has a high resistance to thermal shock. A further object lies in providing a refractory product based on corundum having a high structural elasticity. A further object lies in providing a refractory product based on corundum having a low brittleness. In particular, one object of the invention lies in providing a refractory product based on corundum having a higher resistance to corrosion compared with the refractory products known from the prior art based on $Al_2O_3$, which contain an elastifier in order to improve the resistance to thermal shock, the structural elasticity, and brittleness of said products.

A further object of the invention lies in providing a refractory product based on corundum, which has a high resistance to thermal shock, a high structural elasticity, and a low brittleness, even with only low porosity.

A further object of the invention lies in providing a refractory product based on corundum having a high thermal stability even at high temperatures, in particular an improved thermal stability at high temperatures in oxidising atmosphere compared with $Al_2O_3$ products.

A further object of the invention lies in providing a batch for producing such a product. A further object of the invention lies in providing such a batch as economically as possible.

In order to achieve the objects concerning the product, a refractory product based on $Al_2O_3$ and comprising at least one MAX phase is provided in accordance with the invention.

It has surprisingly been found within the scope of the invention that a refractory product based on $Al_2O_3$ achieving the above objects can be provided when this product comprises at least one MAX phase.

As is known, the term MAX phases designates a material class of layered carbides and nitrides having a layered structure similar to graphite and corresponding to the general formula $M_{n+1}AX_n$, with:

n=1, 2 or 3;
M=a transition metal in the form of Sc, Ti, V, Cr, Zr, Nb, Mo, Hf or Ta;
A=an element of the A-group in the form of Al, Si, P, S, Ga, Ge, As, Cd, In, Sn, Tl or Pb; and
X=C and/or N.

This material class of MAX phases was synthesised for the first time in the 1990s, and the properties thereof were described then for the first time. In accordance with this, MAX phases combine advantageous properties of ceramic and metallic materials, for example a high elasticity, a good thermal and electrical conductivity, a high resistance to chemical corrosion, a low coefficient of thermal expansion, and a high resistance to thermal shock, and tolerance to damage. The Vickers hardness of polycrystalline MAX phases generally lies in the range from 2 to 8 GPa; in this respect MAX phases are softer than most shaped ceramics, but harder than most metals [April 2013, American Ceramic Society Bulletin, Vol. 92, No. 3, Miladin Radovic and Michel W. Barsoum]. In addition, most MAX phases are highly resistant to oxidation. Furthermore, MAX phases at high temperatures experience a conversion from a more brittle to a more plastic behaviour ("brittle-to-plastic transition", BPT), wherein they also demonstrate a plastic bending behaviour in particular. A particular distinguishing feature of MAX phases also lies in particular in that these are extremely tolerant of damage and resistant to thermal shock and usually can be easily mechanically processed. The fracture toughness of MAX phases at room temperature ($K_{tc}$) generally lies in the range from 5 to 20 MPa$\sqrt{m}$ and is therefore relatively high compared with the fracture toughness of other ceramics. The high values of fracture toughness ($K_{tc}$) and the R-curve behaviour are caused by the formation of plastically deformable bridge ligaments and crack-inhibiting properties of buckling limits. A further important property of MAX phases is the extremely high resistance thereof to thermal shock. In contrast with typical ceramics, MAX phases do not easily break under load, and in some cases the residual bending strength thereof even also increases following a loading at temperatures for example of 1,200° C. and a subsequent quenching in water at room temperature.

It has surprisingly been found within the scope of the invention that, on account of these properties, MAX phases may considerably improve the properties of refractory products based on $Al_2O_3$ and in particular may contribute to the provision of refractory products based on $Al_2O_3$ by which the above objects can be achieved. Here, the invention in particular is also based on the surprising finding according to the invention that at least some of the aforementioned advantageous properties of MAX phases transfer to refractory products based on $Al_2O_3$ provided these products comprise at least one MAX phase. Here, it has been found in accordance with the invention that in particular the good properties of MAX phases with regard to the resistance to thermal shock thereof can be transferred to refractory products based on $Al_2O_3$. Here, it has been found in accordance with the invention that the resistance to thermal shock of refractory products based on $Al_2O_3$ increases with a rising proportion of MAX phases.

In this respect refractory products based on $Al_2O_3$ that in accordance with the invention comprise at least one MAX phase have a high resistance to thermal shock and a high structural elasticity.

Furthermore the refractory products based on $Al_2O_3$ that in accordance with the invention comprise at least one MAX phase have a high thermal stability even at high temperatures under oxidising conditions, on account of the resistance to oxidation of the MAX phases.

In addition, refractory products based on $Al_2O_3$ that in accordance with the invention comprise at least one MAX phase have proven to be highly resistant to corrosion on account of the high resistance of the MAX phases to chemical attacks.

In particular, refractory products based on $Al_2O_3$, if these contain at least one MAX phase, may have a high density and low porosity with a nevertheless simultaneously high structural elasticity. In this respect the products according to the invention for example may have a density in the range from 3.6 to 4.0 $g/cm^3$, i.e. for example also a density of at least 3.65 $g/cm^3$, of 3.7 $g/cm^3$ or of at least 3.75 $g/cm^3$; furthermore, the density for example may also be at most 3.95 $g/cm^3$, 3.9 $g/cm^3$ or at most 3.85 $g/cm^3$. The open porosity of the products according to the invention may lie for example in the range from 2 to 4 volume %, i.e. for example may also be at least 2.2 or 2.3 or 2.4 or 2.5 or 2.55 volume %, and for example may also be at most 3.8 or 3.6 or 3.4 or 3.2 or 3.0 or 2.9 or 2.8 or 2.7 or 2.65 volume %.

In accordance with the invention it has been found that the properties of a refractory product based on $Al_2O_3$ in particular may then be improved if this contains at least one MAX phase in a proportion of at least 0.5 mass %. In this respect it may be, in accordance with the invention, that the product according to the invention contains a proportion of MAX phases of at least 0.5 mass %, i.e. for example also of at least 0.6 or 0.8 or 1 or 1.2 or 1.4 or 1.6 or 1.8 or 2.0 or of at least 2.5 mass %.

It has furthermore been found in accordance with the invention that the refractory properties of refractory products based on $Al_2O_3$ also may be adversely influenced by an excessively large proportion of MAX phases. By way of example, the strength of the products may be adversely influenced by an excessively high proportion of MAX phases in the product on account of the relatively low hardness of the MAX phases. Furthermore, it has been found in accordance with the invention that proportions of the MAX phases of a product according to the invention may oxidise if a product according to the invention is exposed at sufficiently high use temperatures to an oxidising atmosphere, for example air. In this case, this may result however in the formation of phases in the product that have a low melting point and that negatively influence the refractory properties of the product, in particular for example the strength properties thereof, in particular the hot strength thereof. In this respect it has proven to be advantageous in accordance with the invention to limit the proportion of MAX phases in the product according to the invention, more specifically in particular to a proportion of at most 40 mass % MAX phases in the product. Thus, MAX phases may be present in the product at most in a proportion of 40 mass %. In some cases, in particular when the product according to the invention is acted on by mechanical load and temperature in oxidative atmosphere, the properties of the product may be further improved if the proportion of MAX phases is below 40 mass %, but in particular is also at least at a level of 0.5% MAX phases. In this respect, the product according to the invention for example may contain a proportion of MAX phases that is at most 40, 35, 30, 25, 20, 15, 14, 13, 12, 11, 10, 9, 8, 7, 6, 5 or 4 mass %.

The specifications in mass % provided herein relate in each case to the total mass of the product according to the invention or of the batch according to the invention, unless specified otherwise in individual cases. The specifications in volume % provided herein relate in each case to the total volume of the product according to the invention or of the batch according to the invention, unless specified otherwise in individual cases.

The product according to the invention is based on $Al_2O_3$. $Al_2O_3$, i.e. corundum, in particular in the form of $\alpha$-$Al_2O_3$ and/or $\beta$-$Al_2O_3$, therefore forms the main phase of the product according to the invention, i.e. is present in the product in the highest mass proportion, i.e. with a higher mass proportion than the other phases of the product.

In particular, $Al_2O_3$ may be present in the product according to the invention for example in proportions of at least 50 mass %, i.e. for example also in proportions of at least 55, 60, 65, 70, 75, 80, 85, 90, 91, 92, 93, 94, 95, 96, 97, 98 or 99 mass %. The product may also contain a proportion of $Al_2O_3$ for example of at most 99.5 mass %, i.e. for example also of at most 99, 98, 96, 95, 92, 90, 88, 85, 80, 75, 70 or 60 mass %.

The at least one MAX phase in the product according to the invention may be present in particular in the form of at least one of the following MAX phases: $Ti_3SiC_2$ or at least one MAX phase for which the following is true:
M=Cr, Zr, Nb, Ti or V
A=Al, Si or Sn
X=C or N.

A MAX phase in the form of $Ti_3SiC_2$ is particularly preferably present in the product.

In accordance with the invention it has been found that the properties of a refractory product based on $Al_2O_3$ may be advantageously influenced in particular by at least one of these MAX phases.

Besides the phases in the form of corundum and at least one MAX phase, the product according to the invention may also contain in particular at least one of the following phases: metallic aluminium, metallic silicon, metallic titanium, metallic iron, at least one carbide, at least one oxycarbonitride, at least one SiCAlON, or at least one alloy from the metals aluminium, silicon, titanium or iron.

Due to the presence of metallic aluminium, silicon, titanium or iron and alloys thereof in the product, the resistance to corrosion of the product may be improved further still, in particular if the application of the product results in the creation of cracks or fracture areas in or on the product. Such cracks or fracture areas in or on the product may be produced for example by a mechanical action on the product, by thermomechanical stresses in the product, by a highly corrosive attack on the product, or at increased temperatures. Metallic aluminium, silicon, titanium or iron or alloys thereof, which was/were previously protected in the interior of the product against the surrounding atmosphere, is/are then exposed along these produced cracks or fracture areas, whereby it/they is/are now exposed to the surrounding atmosphere. In the case of an oxidising atmosphere the metallic aluminium, silicon, titanium or iron or alloys thereof are oxidised, which is associated with a volume increase. The produced cracks and fracture areas may be closed as a result, whereby an infiltration of corrosive media, for example slags or melts, into the product can be prevented. The corrosion resistance of the product can be further improved on account of this self-healing effect.

The product preferably comprises proportions of metallic aluminium, silicon, titanium or iron or alloys thereof in a total mass in the range from 0.1 to 1 mass %.

Carbides may be contained in the product according to the invention, for example in the form of a least one of the following carbides: titanium carbide (TiC) or silicon carbide (SiC), for example in proportions in a total mass in the range from 0.1 to 5 mass %, i.e. for example in proportions of at least 0.5 or 1.5 or 1.8 mass %, and for example also in proportions of at most 4.5 or 4 or 3.5 or 3 or 2.5 or 2.2 mass %.

Oxycarbonitrides may be contained in the product according to the invention for example in the form of aluminium oxycarbonitride, for example in the form of $Al_{28}C_6N_6O_{21}$, for example in proportions from 0.1 to 1 mass %.

SiCAlON, as is known, is formed by mixed crystals based on the elements Si, C, Al, O and N. These are produced in particular on the basis of SiC, in which Si atoms and C atoms are replaced in part by Al atoms, O atoms and N atoms. SiCAlONs may be present in the product for example in proportions from 0.1 to 1 mass %.

It has been found in accordance with the invention that the resistance to corrosion of the product according to the invention can be further improved if this product contains at least one carbide, at least one oxycarbonitride, or at least one SiCAlON in particular in the aforementioned proportions.

It has been found in accordance with the invention that the advantageous properties of the product according to the invention, i.e. in particular the high resistance thereof to thermal shock, the high structural elasticity thereof, the low brittleness thereof, and the high resistance to corrosion thereof, may be compromised if, besides the aforementioned phases, further phases are also present, since the product according to the invention may react very sensitively to such further phases.

In this respect, in accordance with the invention, the product according to the invention, besides the aforementioned phases, i.e. $Al_2O_3$, MAX phases, metallic aluminium, metallic silicon, metallic titanium, metallic iron, alloys from the aforementioned metals, carbides, oxycarbonitrides and SiCAlONs, may not contain any further phases, or such further phases may be contained at most in small proportions, in particular in a proportion below 2 mass %, i.e. for example also in a proportion below 1 or below 0.5 mass %.

It has been found in accordance with the invention that the properties of the product according to the invention may be negatively influenced in particular by the presence of elements of the IA group and VIIA group of the Periodic System, even if these elements are present in the product only in very small proportions. In this respect, the total mass of lithium, sodium and potassium in the product in particular may be below 2 mass %, i.e. for example also below 1 or 0.5 mass %. With regard to the elements fluorine and chlorine, the total mass of these elements in the product may be below 0.1 mass %, i.e. for example also below 0.05 or 0.01 mass %.

The structure of the product according to the invention is formed from a matrix of $Al_2O_3$, into which the least one MAX phase is incorporated.

On the whole, besides the at least one MAX phase, all further phases of the product may also be incorporated into the matrix of $Al_2O_3$.

The phases of the product incorporated into the matrix of $Al_2O_3$ are incorporated into the matrix of $Al_2O_3$ as "islands" isolated from one another. The matrix of $Al_2O_3$ in the product according to the invention thus forms a phase which is continuous through the entire product and into which the further phases are incorporated separately from one another.

The product preferably has a substantially isotropic structure. In this respect, the phases of the product are distributed substantially uniformly over the volume of the product. The phases of the product are therefore in particular not distributed over the volume of the product in an anisotropic manner, for example in a layered manner.

On account of this uniform or isotropic distribution of the phases present in the product besides $Al_2O_3$, the product has relatively uniform properties over the entire volume.

It is thus ensured that the product has its advantageous properties uniformly over the entire volume, even with only low proportions of MAX phases and other phases.

The product according to the invention in particular comprises proportions of the elements aluminium, carbon, silicon, titanium, nitrogen and oxygen. As mentioned previously, proportions of the elements aluminium, silicon and titanium may also be present here in elementary form. Aside from this, these elements and also the other elements are present in the product primarily not in elementary form, but in the form of compounds. The proportions of the elements aluminium, carbon, silicon, titanium, nitrogen and oxygen in the product may be as follows for example, wherein the proportion of any one of these elements is independent in principle of the proportion of the other elements:

aluminium: 10 to 60 mass %, i.e. for example also at least 20, 30, 40, 42, 44, 46, 47, 48 or 49%, and for example also at most 58, 56, 55, 54, 53, 52 or 51 mass %;

carbon: 0.5 to 10 mass %, i.e. for example also at least 0.8 or 1 mass %, and for example also at most 9, 8, 7, 6, 5, 4, 3 or 2.5 or 2 or 1.7 or 1.5 or 1.3 or 1.2 mass %;

silicon: 0.5 to 10 mass %, i.e. for example also at least 1 or 1.2 mass %, and for example also at most 9, 8, 7, 6, 5, 4, 3 or 2.5 or 2 or 1.8 or 1.6 or 1.4 mass %;

titanium: 1 to 30 mass %, i.e. for example also at least 1.5 or 2.5 or 3 or 3.5 mass %, and for example also at most 20, 15, 10, 8, 6 or 5 or 4 or 3.5 mass %;

nitrogen: 0.01 to 0.5 mass %, i.e. for example also at least 0.02 or 0.04 or 0.05 or 0.06 or 0.07 or 0.08 mass %, and for example also at most 0.4 or 0.3 or 0.2 or 0.15 mass %;

oxygen: 30 to 60 mass %, i.e. for example also at least 35, 40 or 42.5 or 43 or 43.3 mass %, and for example also at most 55, 50, 48, 46 or 45 or 44.5 or 44 or 43.7 mass %.

In accordance with the invention, besides the elements aluminium, carbon, silicon, titanium, iron, nitrogen and oxygen, further elements may also be present in the product in a proportion below 2 mass %, i.e. for example also below 1.5 or 1 or 0.5 mass %.

In order to produce the product according to the invention described hearing, a batch having the following features is made available:

The batch comprises one or more components comprising aluminium, carbon, silicon and titanium;
the proportions of aluminium, carbon, silicon and titanium in the batch introduced into the batch by the components lie in the following ranges, in each case in relation to the total mass of the batch:
aluminium, calculated as $Al_2O_3$: 10 to 97 mass %, i.e. for example also at least 20, 30, 40, 50, 55, 60, 65, 70 or 75 mass %, and for example also at most 95, 92, 90, 88, 86, 84, 82 or 80 mass %;
carbon: 1 to 30 mass % i.e. for example also at least 2, 3, 4, 5 or 6 mass %, and for example also at most 25, 20, 15, 13, 12, 11, 10, 9 or 8 mass %;
silicon, calculated as $SiO_2$: 1 to 20 mass % i.e. for example also at least 2, 3, 4, 5, 6, 7 or 8 mass %, and for example also at most 18, 16, 15, 14, 13, 12, 11, 10 or 9 mass %;
titanium, calculated as $TiO_2$: 1 to 50 mass %, i.e. for example also at least 1.5 or 2 or 2.5 or 3 or 3, 5 or 4 mass % and for example also at most 45, 40, 35, 30, 25, 20, 15, 14, 13, 12, 10, 9, 8, 7 or 6 mass %.

The components, i.e. the raw materials of the batch, may be one or more components or raw materials by which proportions of aluminium, carbon, silicon and titanium can be provided for the production of the product according to the invention. Here, a number of the elements aluminium, carbon, silicon or titanium may also be provided for example by one component. By way of example, aluminium, silicon and oxygen can be provided by a component in the form of mullite. If the product produced from the batch, besides the elements aluminium, carbon, silicon or titanium, also contains the further elements nitrogen and oxygen, these are in particular reaction products of the components of the batch with nitrogen and oxygen from the air or atmosphere during the application of heat in order to produce the product.

It has surprisingly been found in accordance with the invention that, by a batch having the features according to the invention, a product according to the invention can be produced, which, besides any further phases, in particular also contains MAX phases in the form of at least one of the following MAX phases: $Ti_3SiC_2$ or at least one MAX phase for which the following is true:
M=Cr, Zr, Nb, Ti or V
A=Al, Si or Sn
X=C or N.

The at least one aluminium-comprising component of the batch may be present in particular in the form of at least one of the following components: sintered corundum, fused corundum, calcined alumina, tabular alumina or bauxite. The component comprised in aluminium is particularly preferably present in the form of calcined alumina.

The aluminium-comprising component may have any form in principle, but is preferably present in the form of $Al_2O_3$. The aluminium-comprising component preferably has a proportion of $Al_2O_3$ of more than 50 mass % in relation to the aluminium-comprising component, i.e. for example also a proportion of more than 55, 60, 65, 70, 75, 80, 85, 90, 92, 94, 95, 96, 97, 98 or 99 mass %.

The aluminium-comprising component preferably has a particle size d90 of at most 500 μm.

The aluminium-comprising component is present in the batch preferably in proportions in the range from 10 to 98 mass %, i.e. for example also in proportions of at least 20, 30, 40, 50, 55, 60, 65, 68, 70 or 71 mass %, and for example also in proportions of at most 95, 90, 85, 80, 75 or 73 mass %.

The at least one component of the batch comprising carbon is present preferably in the form of at least one of the following components: graphite (natural or synthetic graphite), anthracite, carbon black, petroleum coke or resin, for example silicone resin or phenol resin. The carbon-comprising component is particularly preferably present in the form of graphite.

The proportion of carbon of the carbon-comprising component is particularly preferably more than 92%, in relation to the mass of the carbon-comprising component, i.e. for example is also more than 94, 95 or 96 mass %.

The carbon-comprising component preferably has a particle size d90 of less than 1 mm.

The carbon-comprising component is preferably present in the batch in proportions in the range from 1 to 30 mass %, i.e. for example also in proportions of at least 2, 3, 4, 5, 6 or 7 mass %, and for example also in proportions of at most 25, 20, 15, 14, 13, 12, 11, 10 or 9 mass %.

The at least one component of the batch comprising silicon may be present in particular in the form of at least one of the following components: kaolin, fireclay, at least one refractory clay (in particular with the main phase kaolinite), at least one mullite raw material (in particular sintered mullite, fused mullite or mullitised raw materials), quartzite, quartz sand or zirconium (zirconium silicate, $ZrSiO_4$). The silicon-comprising component is particularly preferably present in the form of kaolin.

The silicon-comprising component may comprise silicon in principle in any form, but particularly preferably in the form of at least one of the components kaolin or fireclay. In accordance with an especially preferred embodiment the silicon-comprising component is present in the form of kaolin, in particular for example in calcined form, which has the advantage that it may result in no escape of water components of the kaolin during the heat treatment of a batch comprising such a calcined kaolin.

The particle size of the silicon-comprising component may be present for example in a particle size d90 below 50 μm, i.e. for example also in a particle size d90 less than 40 μm, 30 μm, 20 μm or less than 10 μm.

The at least one silicon-comprising component, in particular kaolin, may be present in the batch preferably in proportions in the range from 1 to 40 mass %, i.e. for example also in proportions of at least 2, 4, 6, 8, 10, 12, 13 or 14 mass %, and for example also in proportions of at most 35, 30, 28, 26, 24, 22, 20, 18, 17 or 16 mass %.

The at least one component of the batch comprising titanium may be present in particular in the form of a least one of the following raw materials: rutile or aluminium titanate. The titanium-comprising component is present preferably in the form of rutile, for example in the form of natural rutile sand.

The titanium-comprising component may comprise titanium in principle in any form, but preferably in the form of $TiO_2$. The titanium-comprising component preferably comprises a proportion of $TiO_2$ of more than 95 mass % in relation to the titanium-comprising component, i.e. for example also of more than 96, 97, 98 or 99 mass %.

The titanium-comprising component preferably lies in a particle size d90 up to 200 μm or therebelow.

The at least one titanium-comprising component may be present in the batch for example in the following proportions in a range from 1 to 50 mass %, i.e. for example also in a proportion of at least 1.5 or 2 or 2.5 or 3 or 3.5 or 4 or 4.5 mass %, and for example also in a proportion of at most 40, 30, 20, 15, 12, 10, 8 or 7.5 or 7 or 6.5 or 6 or 5.5 mass %.

Although the batch may contain the proportions of aluminium, silicon and titanium in principle in any form in this respect, the proportions thereof in the batch will be specified hereinafter in the form of their oxides, as is usual in refractory technology.

It has been found completely surprisingly within the scope of the invention that a refractory product based on $Al_2O_3$ can be formed by a batch according to the invention, in particular if this contains the above-mentioned components or raw materials, said product comprising at least one of the following MAX phases: $Ti_3SiC_2$ or at least one MAX phase for which the following is true:
M=Cr, Zr, Nb, Ti or V
A=Al, Si or Sn
X=C or N.

This aspect is all the more surprising under consideration of the fact that until now very costly raw materials or precursors routinely had to be used for the production of MAX phases. By use of the batch according to the invention, however, a new technology is now available for synthesising MAX phases by much more favourable raw substances. In particular, the invention now provides a technology for providing MAX phases for refractory applications cost-effectively and economically. By contrast, MAX phases could not be used previously for refractory applications on account of the costly precursors, even though the technical potential of MAX phases for refractory applications had already been identified.

Furthermore, it has surprisingly been found in accordance with the invention that a refractory product based on $Al_2O_3$ can be produced by a batch according to the invention, which product, besides MAX phases, also contains the further preferred phases of the product according to the invention, i.e. in particular at least one of the following phases: metallic aluminium, metallic silicon, metallic titanium, metallic iron, at least one carbide, at least one oxycarbonitride, at least one SiCAlON, or at least one alloy from the metals aluminium, silicon, titanium or iron.

It has been found in accordance with the invention that the batch according to the invention may react very sensitively to further components or to raw materials contained by the batch besides the aforementioned components. In this respect, further components besides the aforementioned components for example may cause MAX phases to be formed in the product only to a reduced extent. In this respect, in accordance with the invention, the batch according to the invention, besides the aforementioned components, may also contain further components in a proportion less than 2 mass %, i.e. for example also in a proportion less than 1.5 or 1 or 0.5 mass %.

In particular, the batch according to the invention may contain proportions of elements of the IA group and VIIA group of the Periodic System only in very low proportions. In this respect, in particular, the total mass of lithium (calculated as lithium oxide), sodium (calculated as sodium oxide), and potassium (calculated as potassium oxide) in the batch may be less than 2 mass %, i.e. for example also less than 1 or 0.5 mass %. With regard to the elements fluorine and chlorine, the total mass of these elements in the batch may be less than 0.1 mass %, i.e. for example also less than 0.05 or 0.01 mass %.

The invention also relates to a method for producing the refractory product according to the invention, said method comprising the following steps:
providing a batch according to the invention;
application of heat to the batch;
cooling the batch applied to heat.

In order to mix the components of the batch uniformly, the batch may be mixed before the application of heat. By way of example, the batch may be granulated during the mixing. Water may be added to the batch. If the batch is mixed to form granules, the formation of granules can be facilitated by this water component.

The optionally mixed refractory batch is then exposed to heat. In particular the batch is exposed to heat of such a temperature that the components of the batch form at least one MAX phase, in particular at least one of the following MAX phases: $Ti_3SiC_2$ or at least one MAX phase for which the following is true:
M=Cr, Zr, Nb, Ti or V
A=Al, Si or Sn
X=C or N.

Furthermore, the batch is preferably exposed to heat of such a temperature that the components of the batch, besides the aforementioned MAX phases, also form at least one of the further phases contained by the product according to the invention, preferably in addition to the MAX phases, i.e. in particular at least one of the following phases: metallic aluminium, metallic silicon, metallic titanium, metallic iron, at least one carbide, at least one oxycarbonitride, at least one SiCAlON or at least one alloy of the metals aluminium, silicon, titanium or iron.

The batch is preferably acted on by heat having a temperature above 2,000° C. The batch is preferably melted at temperatures above 2,000° C.

The period for which the batch must be heated in order to melt is dependent in particular on the size of the charge to be melted. If the melt charge for example is 10 to 30 t, a melt period in the range from 12 to 24 hours for example may be sufficient to completely melt the batch.

The batch is particularly preferably melted, i.e. exposed to heat in such a way that a melt is formed from the batch. In principle, the batch may be melted using any melting apparatuses known from the prior art, for example by way of an electric arc furnace.

It would also be theoretically possible, although not preferred in accordance with the invention, to subject the batch according to the invention to ceramic firing rather than melting said batch. Here, the optionally mixed and granulated batch could additionally be shaped to form a green body, i.e. an unfired refractory shaped body, for example by pressing, and subsequently could be subjected to ceramic firing.

The batch exposed to heat, or the melt is then left to cool.

Following the cooling a refractory product based on $Al_2O_3$ comprising MAX phases is obtained.

The obtained product may then be treated further, for example comminuted and for example processed with a desired particle size or particle size distribution.

The comminuted product may be used in particular as a raw material for the production of refractory products.

The invention therefore also relates to the use of the product according to the invention or of the product producible by the batch according to the invention and produced by the method according to the invention as a raw material for the production of refractory products.

The use according to the invention is particularly preferably implemented on the proviso that the product is used as a raw material for the production of refractory products in the form of magnesia-carbon bricks (MgO—C bricks), carbonaceous non-basic bricks (in particular alumina-carbon bricks, $Al_2O_3$—C bricks), or alumina-magnesia-carbon bricks (AMC bricks). In this respect the product according to the invention can be added for example as further component to batches for producing magnesia-carbon bricks, alumina-carbon bricks, or alumina-magnesia-carbon bricks.

The invention also relates to a refractory product that is produced from the batch according to the invention and/or that is produced by a method according to the invention.

In this respect the product producible or produced from the batch or the product produced by the method according to the invention has the properties of the refractory product according to the invention.

The use of the product according to the invention as a raw material for producing a refractory product may be implemented in accordance with a preferred embodiment on the proviso that the refractory product is added to the batch for producing a refractory product together with further raw materials.

In accordance with the invention it has also been found that the product according to the invention is suitable as a material for metalworking. The invention therefore also relates to the use of the product according to the invention and of the product producible by the batch according to the invention and produced by the method according to the invention as a material for metalworking, in particular as a material for cutting tools or material-removing machining tools for metalworking, in particular for example cutting machining tools in the form of milling, drilling, turning or grinding tools for metalworking.

Further features of the invention will emerge from the dependent claims, the drawings, and the following description of the drawings.

All the features of the invention may be combined with one another individually or in any combination.

A practical example of the invention will be explained in greater detail hereinafter:

EXAMPLE

In order to produce a refractory product according to the invention a batch according to the invention was first provided, which contained a aluminium-comprising component in the form of calcined alumina, a carbon-comprising component in the form of natural graphite, a silicon-comprising component in the form of kaolin, and a titanium-comprising component in the form of natural rutile sand. The batch had a total mass of approximately 400 kg.

The calcined alumina contained a proportion of $Al_2O_3$ of more than 99 mass % and a proportion of $Na_2O$ of less than 0.4 mass %, in each case in relation to the total mass of the calcined alumina. The calcined alumina had a particle size d90 of less than 100 μm. The proportion of calcined alumina in the total mass of the batch was 72 mass %.

The natural graphite had a proportion of carbon of more than 94.5 mass % and a proportion of clay minerals of less than 5 mass %, in each case in relation to the total mass of the graphite. The graphite was present in a particle size d90 of less than 500 μm. The proportion of graphite in the total mass of the batch was 8 mass %.

The kaolin had a proportion of kaolinite and other clay minerals of more than 97 mass % and a proportion of $Fe_2O_3$, $Na_2O$ and $K_2O$ of less than 1.6 mass %, in each case in relation to the total mass of the kaolin. The kaolin was present in a particle size d90 of less than 20 μm. The proportion of kaolin in the total mass of the batch was 15 mass %.

The used $TiO_2$ carrier had a proportion of $TiO_2$ of more than 98 mass %, in relation to the total mass of the $TiO_2$ carrier. The particle size d90 of the $TiO_2$ carrier was less than 150 μm. The proportion of the $TiO_2$ carrier in the total mass of the batch was 5 mass %.

The proportions of aluminium, carbon, silicon and titanium in the batch were within the following ranges:
aluminium, calculated as $Al_2O_3$: 78 mass %;
carbon: 7.6 mass %;
silicon, calculated as $SiO_2$: 8.61 mass %;
titanium, calculated as $TiO_2$: 5 mass %;
$Fe_2O_3$: 0.17 mass %;
$Na_2O+K_2O$: 0.43 mass %;
remainder: 0.19 mass %.

The batch was then mixed.

The accordingly prepared batch was then acted on by the electric arc in an electric arc furnace for approximately 6 hours in a reducing atmosphere, whereby the batch was heated to temperatures above approximately 2,000° C. and a melt formed from the batch.

The melt was then cooled, whereupon a product according to the invention was obtained in the form of an ingot.

This product contained, as main phase, corundum ($Al_2O_3$). The product according to the invention contained, as further phases, a MAX phase in the form of $Ti_3SiC_2$ in a proportion of 2 mass %, and also the further phases titanium carbide (TiC) in a proportion of less than 2 mass % and silicon carbide (SiC) in a proportion of less than 1 mass %. Further phases in the form of nitride and carbide phases, in particular also SiCAlON phases, were present in a proportion of less than 1 mass %, as well as metallic aluminium, metallic silicon, metallic titanium and metallic iron and alloys thereof in a total proportion of less than 1 mass %. In addition further phases were present in a total proportion of less than 2 mass %.

The product had a density of 3.8 g/cm³ and an open porosity of 2.6 volume %.

All of the specifications provided herein with regard to density and open porosity were determined in accordance with British Standard BS 1902-3.16:1990. Here, the density was measured at a mercury pressure of 0.52 psia (pound-force per square inch). The open porosity was calculated by measurement at 0.52 psia and 33,000 psia.

In the product the corundum formed a continuous matrix, into which the further phases were incorporated as islands isolated from one another. On the whole, the product had a substantially isotropic structure, in which the phases were distributed substantially uniformly over the entire volume of the product.

The drawings below show enlarged views of thin polished sections of the product.

FIG. 1 shows a detail with an area of approximately 1.2 mm×0.9 mm. The bar in the lower right-hand corner of the image corresponds to a length of 200 μm. FIG. 1 shows the dark matrix 1 formed of corundum, in which the further phases, which are lighter in FIG. 1, are embedded in an island-like manner. A first island is designated in FIG. 1 by A, and a second island is designated by B.

Figure 2:
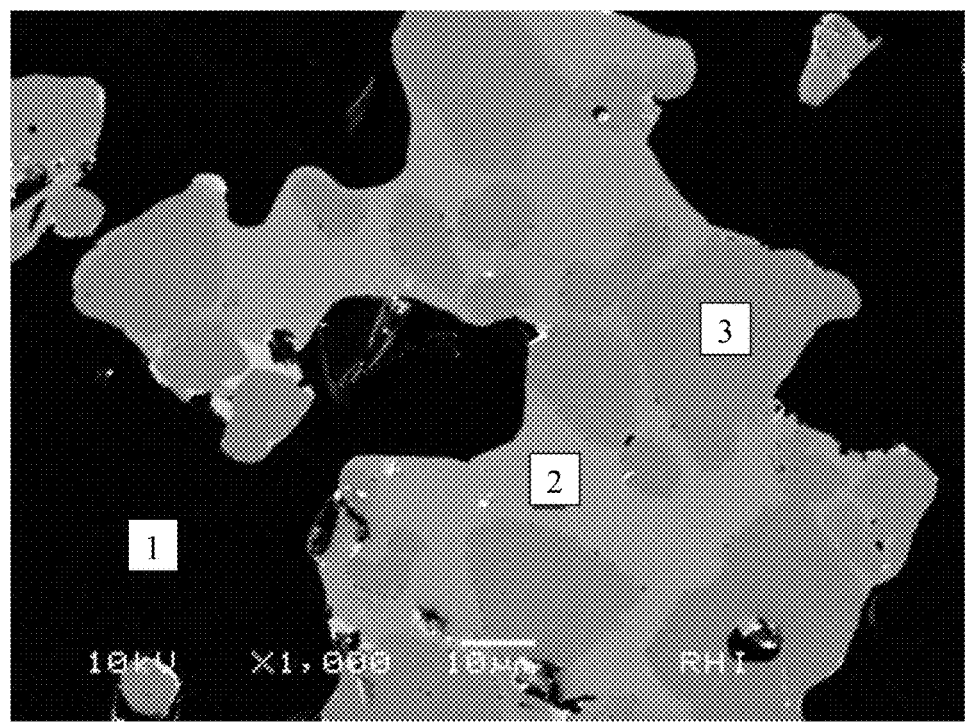

The detail designated by A in FIG. 1 is illustrated in an enlarged manner in FIG. 2. The detail in FIG. 2 corresponds to a size of approximately 130 μm×100 μm. The white bar at the bottom of the image in the middle corresponds to a length of 10 μm. What can be seen is the dark matrix 1 formed of corundum, which is characterised by reference sign 1. The light-grey MAX phase in the form of $Ti_3SiC_2$ is characterised by the reference sign 2, whereas the phase in the form of TiC, which has a darker grey compared with the MAX phase 2, is characterised by reference sign 3.

Figure 3:
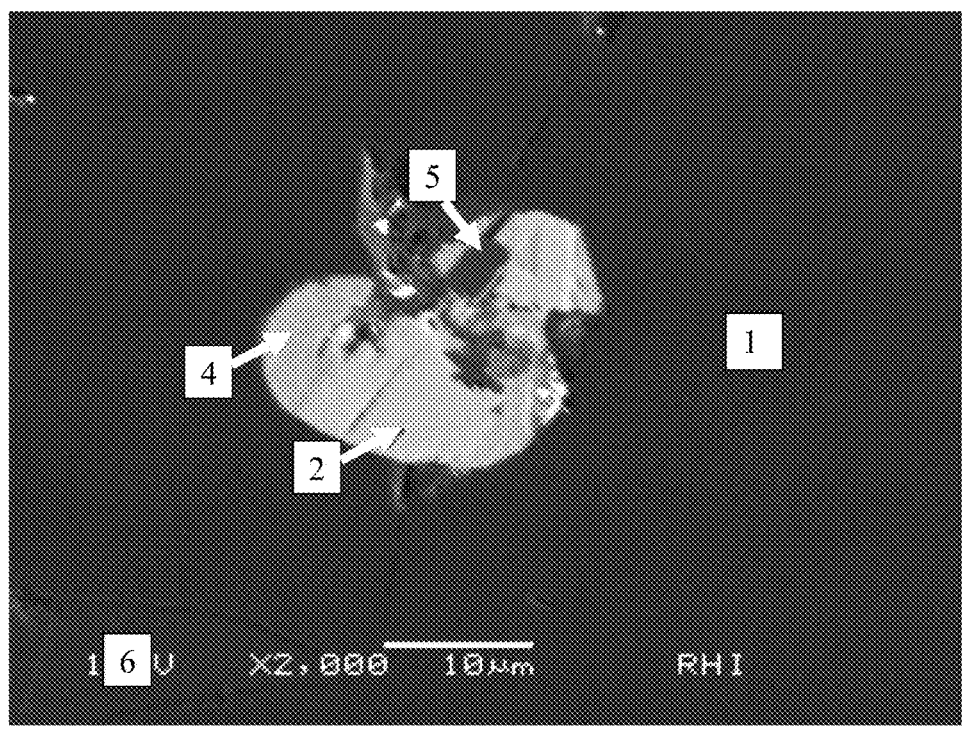

A further detail from the view according to FIG. 1 is illustrated in FIG. 3. The detail corresponds to a size of approximately 65 μm×50 μm. The white bar at the bottom of the image in the middle corresponds to a length of 10 μm. What can be seen in FIG. 3 is the again dark binder matrix 1 in the form of corundum, in which island-like lighter phases are embedded. The island illustrated in FIG. 3 has a MAX phase characterised by reference sign 2 in the form of $Ti_3SiC_2$, metallic aluminium, silicon and titanium designated by reference sign 4, and also silicon carbide designated by reference sign 5. Aluminium oxycarbonitride ($Al_{28}C_6N_6O_{21}$) incorporated into the matrix 1 formed of corundum is characterised by reference sign 6.

For use of the refractory product produced in accordance with the practical example as a raw material for the production of a refractory product, said product was granulated, i.e. processed into a granular material. For this purpose the product present as an ingot was first comminuted by the means known from the prior art into granular material and was then provided as raw material for the production of a refractory product.

Since the pores of the product act as predetermined breaking points during the comminution, the density and open porosity of the granular material and of the ingot differ from one another. Here, the density of the granular material tends to be greater than the density of the ingot, and the open porosity of the granular material tends to be smaller than the open porosity of the ingot.

The invention claimed is:

1. A refractory product based on $Al_2O_3$, comprising at least one MAX phase, and containing at least one of the following phases: metallic aluminum, metallic silicon, metallic titanium, metallic iron, or at least one alloy from at least two of these metals.

2. The product according to claim 1, having a proportion of MAX phases of at least 0.5 mass %.

3. The product according to claim 1, having a proportion of $Al_2O_3$ of at least 50 mass %.

4. The product according to claim 1, containing at least one of the following phases: at least one carbide, at least one oxycarbide, at least one oxycarbonitride, or at least one SiCAlON.

5. The product according to claim 1, in which the structure is formed from a matrix of $Al_2O_3$, into which at least one MAX phase is incorporated.

6. A batch for producing a refractory product based on $Al_2O_3$ comprising at least one MAX phase, wherein the batch has the following features:
   the batch comprises one or more components comprising aluminum, carbon, silicon or titanium;
   the proportions of aluminum, carbon, silicon and titanium in the batch, which are introduced into the batch by the components, lies in the following ranges, in each case in relation to the total mass of the batch:
   aluminum, calculated as $Al_2O_3$: 10 to 97 mass %;
   carbon: 1 to 30 mass %;
   silicon, calculated as $SiO_2$: 1 to 20 mass %;
   titanium, calculated as $TiO_2$: 1 to 50 mass %;
   the batch having an aluminum-comprising component in the form of at least one of the following components: sintered corundum, fused corundum, calcined alumina, tabular alumina, or bauxite;
   the batch having a carbon-comprising component in the form of at least one of the following components: graphite, anthracite, petroleum coke, or carbon black;
   the batch having a silicon-comprising component in the form of at least one of the following components: kaolin, fireclay, at least one refractory clay, at least one raw material comprising mullite, quartzite, quartz sand, or zirconium;
   the batch having a titanium-comprising component in the form of rutile.

7. A method for producing a refractory product, the refractory product based on $Al_2O_3$, the refractory product comprising at least one MAX phase, the method comprising the following steps:
   providing a batch for producing the refractory product, wherein the batch has the following features:
   the batch comprises one or more components comprising aluminum, carbon, silicon or titanium;
   the proportions of aluminum, carbon, silicon and titanium in the batch, which are introduced into the batch by the components, lies in the following ranges, in each case in relation to the total mass of the batch:
   aluminum, calculated as $Al_2O_3$: 10 to 97 mass %;
   carbon: 1 to 30 mass %;
   silicon, calculated as $SiO_2$: 1 to 20 mass %; and
   titanium, calculated as $TiO_2$: 1 to 50 mass %;
   the batch having an aluminum-comprising component in the form of at least one of the following components: sintered corundum, fused corundum, calcined alumina, tabular alumina, or bauxite;
   the batch having a carbon-comprising component in the form of at least one of the following components: graphite, anthracite, petroleum coke, or carbon black;
   the batch having a silicon-comprising component in the form of at least one of the following components: kaolin, fireclay, at least one refractory clay, at least one raw material comprising mullite, quartzite, quartz sand, or zirconium;
   the batch having a titanium-comprising component in the form of rutile;
   applying heat to the batch; and
   cooling the batch applied to heat.

* * * * *